US010564053B2

(12) United States Patent
Contreras et al.

(10) Patent No.: US 10,564,053 B2
(45) Date of Patent: *Feb. 18, 2020

(54) HAMR THERMAL SENSOR WITH FAST RESPONSE TIME

(71) Applicant: Western Digital Technologies, Inc., San Jose, CA (US)

(72) Inventors: John T. Contreras, Palo Alto, CA (US); Lidu Huang, Danville, CA (US); Shen Ren, Union City, CA (US); Erhard Schreck, San Jose, CA (US); Rehan Ahmed Zakai, San Ramon, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/229,855

(22) Filed: Dec. 21, 2018

(65) Prior Publication Data

US 2019/0120705 A1 Apr. 25, 2019

Related U.S. Application Data

(63) Continuation of application No. 15/160,325, filed on May 20, 2016, now Pat. No. 10,175,122.

(51) Int. Cl.
| | |
|---|---|
| *G06F 11/30* | (2006.01) |
| *G01K 15/00* | (2006.01) |
| *G01K 7/16* | (2006.01) |
| *G11B 5/31* | (2006.01) |

(Continued)

(52) U.S. Cl.
CPC ............ *G01K 15/005* (2013.01); *G01K 7/16* (2013.01); *G11B 5/314* (2013.01); *G11B 5/5534* (2013.01); *G11B 2005/0021* (2013.01)

(58) Field of Classification Search
CPC .................................................. G01K 15/005
See application file for complete search history.

(56) References Cited

U.S. PATENT DOCUMENTS

| | | |
|---|---|---|
| 8,514,672 B2 | 8/2013 | Grobis et al. |
| 8,705,323 B2 | 4/2014 | Contreras et al. |
| 8,842,507 B1 | 9/2014 | Hirano et al. |
| (Continued) | | |

*Primary Examiner* — Phuong Huynh
(74) *Attorney, Agent, or Firm* — Patterson & Sheridan, LLP; Steven H. Versteeg

(57) ABSTRACT

Embodiments disclosed herein generally relate to a method for monitoring optical power in a HAMR device. In one embodiment, the method includes enhancing a thermal sensor bandwidth through advanced electrical detection techniques. The advanced electrical detection techniques include obtaining calibration waveform data for a thermal sensor by calibrating the thermal sensor, obtaining real-time waveform data for the thermal sensor that may deviate from the calibration waveform data, updating the calibration waveform data to include the real-time waveform data, repeating obtaining real-time waveform data and updating the calibration waveform data during writing operations. By updating the calibration waveform data, the bandwidth of the thermal sensor is determined by a fixed sampling time interval, and the thermal sensor rise time to steady state would not be a limitation to its response time.

19 Claims, 5 Drawing Sheets

(51) Int. Cl.
 *G11B 5/00* (2006.01)
 *G11B 5/55* (2006.01)

(56) References Cited

U.S. PATENT DOCUMENTS

| | | |
|---|---|---|
| 8,861,124 B1 | 10/2014 | Finot et al. |
| 9,087,546 B1 | 7/2015 | Grobis et al. |
| 9,153,276 B2 | 10/2015 | Johnson et al. |
| 10,175,122 B2 * | 1/2019 | Contreras ............ G01K 15/005 |
| 2005/0029453 A1 * | 2/2005 | Allen ........................ G01J 5/06 |
| | | 250/332 |

* cited by examiner

HAMR THERMAL SENSOR WITH FAST RESPONSE TIME

CROSS-REFERENCE TO RELATED APPLICATIONS

This application is a continuation of co-pending U.S. patent application Ser. No. 15/160,325, filed May 20, 2016, which is herein incorporated by reference.

BACKGROUND

Field

Embodiments disclosed herein generally relate to a magnetic media device employing a heat-assisted magnetic recording (HAMR) head, and more particularly, to a device formed by a method for monitoring optical power in the HAMR head.

Description of the Related Art

Higher storage bit densities in magnetic media used in media drives, such as disk drives, have reduced the size (volume) of magnetic bits to the point where the magnetic bit dimensions are limited by the grain size of the magnetic material. Although grain size can be reduced further, the data stored within the magnetic bits may not be thermally stable. That is, random thermal fluctuations at ambient temperatures may be sufficient to erase data. This state is described as the superparamagnetic limit, which determines the maximum theoretical storage density for a given magnetic media. This limit may be raised by increasing the coercivity of the magnetic media or by lowering the temperature. Lowering the temperature may not always be practical when designing hard disk drives for commercial and consumer use. Raising the coercivity, on the other hand, requires write heads that incorporate higher magnetic moment materials, or techniques such as perpendicular recording (or both).

One additional solution has been proposed, which uses heat to lower the effective coercivity of a localized region on the magnetic media surface and writes data within this heated region. The data state becomes "fixed" once the media cools to ambient temperatures. This technique is broadly referred to as heat-assisted magnetic recording, or HAMR, which can be applied to longitudinal and perpendicular recording systems as well as "bit patterned media". Heating of the media surface has been accomplished by a number of techniques such as focused laser beams or near-field optical sources.

The optical power in the light delivery path of HAMR heads affects the heating temperature profile, and hence the recording quality during HAMR recording. During writing operations, optical power from a laser diode (LD) may fluctuate due to mode hopping, operation temperature drift, and aging. Monitoring and controlling this optical power can improve HAMR recording quality, reliability and head lifetime. Therefore, an improved method for monitoring optical power in a HAMR device is needed.

SUMMARY

Embodiments disclosed herein generally relate to a device formed by a method for monitoring optical power in a HAMR device. In one embodiment, the method includes enhancing a thermal sensor bandwidth through advanced electrical detection techniques. The advanced electrical detection techniques include obtaining calibration waveform data for a thermal sensor by calibrating the thermal sensor, obtaining real-time waveform data for the thermal sensor that may deviate from the calibration waveform data, updating the calibration waveform data to include the real-time waveform data, repeating obtaining deviated waveform data and updating the calibration waveform data during writing operations. By updating the calibration waveform data, the bandwidth of the thermal sensor is determined by a fixed sampling time interval, and the thermal sensor rise time to steady state would not be a limitation to its response time.

In one embodiment, a device formed by a method includes obtaining calibration waveform data for a resistance of a thermal sensor, obtaining real-time waveform data for the resistance of the thermal sensor, updating the calibration waveform data to include the real-time waveform data, and repeating the obtaining real-time waveform data and updating the calibration waveform data.

In another embodiment, a device formed by a method includes heating a thermal sensor to a predetermined temperature, maintaining the temperature of the thermal sensor at the predetermined temperature while the thermal sensor is operating at a steady state, measuring and tracking a resistance value of the thermal sensor, and maintaining the resistance value of the thermal sensor at a substantially constant value.

In another embodiment, a device formed by a method includes heating a thermal sensor to a predetermined temperature, obtaining calibration waveform data for a resistance of the thermal sensor, maintaining the temperature of the thermal sensor at the predetermined temperature while the thermal sensor is operating at a steady state, measuring and tracking a resistance value of the thermal sensor, maintaining the resistance value of the thermal sensor at a substantially constant value, obtaining real-time waveform data for the resistance of the thermal sensor, updating the calibration waveform data to include the real-time waveform data, and repeating the obtaining real-time waveform data and updating the calibration waveform data.

BRIEF DESCRIPTION OF THE DRAWINGS

So that the manner in which the above recited features of the disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments in any field involving magnetic sensors.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments. However, it should be understood that the disclosure is not limited to specific described embodiments. Instead, any combination of the following features and elements, whether related to different embodiments or not, is contemplated to implement and practice the claimed subject matter. Furthermore, although embodiments described herein may achieve advantages over other possible solutions and/or over the prior art, whether or not a particular advantage is achieved by a given embodiment is not limiting of the claimed subject matter. Thus, the following aspects, features, embodiments and advantages are merely illustrative and are not considered elements or limitations of the appended claims except where explicitly recited in a claim(s).

Embodiments disclosed herein generally relate to a device formed by a method for monitoring optical power in a HAMR device. In one embodiment, the method includes enhancing a thermal sensor bandwidth through advanced electrical detection techniques. The advanced electrical detection techniques include obtaining calibration waveform data for a thermal sensor by calibrating the thermal sensor, obtaining real-time waveform data for the thermal sensor that may deviate from the calibration waveform data, updating the calibration waveform data to include the real-time waveform data, repeating obtaining real-time waveform data and updating the calibration waveform data during writing operations. By updating the calibration waveform data, the bandwidth of the thermal sensor is determined by a fixed sampling time interval, and the thermal sensor rise time to steady state would not be a limitation to its response time.

Figure 1A:
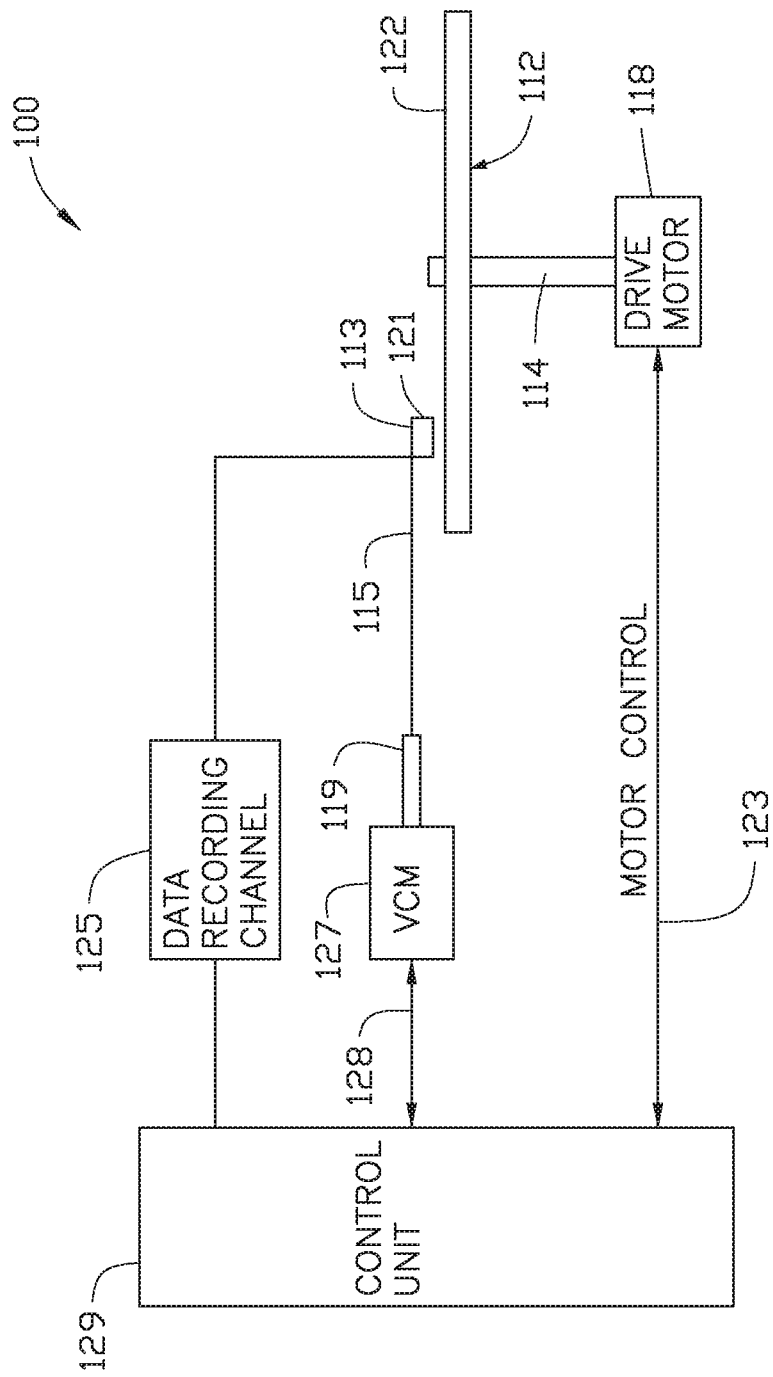
FIG. 1A illustrates a magnetic media drive system according to one embodiment described herein.

FIG. 1A illustrates a magnetic media drive 100 embodying this disclosure. As shown, at least one magnetic medium 112, such as a magnetic disk, is supported on a spindle 114 and rotated by a media drive motor 118. The magnetic recording on each medium is in the form of any suitable patterns of data tracks, such as annular patterns of concentric data tracks (not shown) on the magnetic medium 112.

At least one slider 113 may be positioned near the magnetic medium 112, each slider 113 supporting one or more magnetic head assemblies 121 that may include a radiation source (e.g., a LD or LED) for heating the medium surface 122. As the magnetic medium 112 rotates, the slider 113 moves radially in and out over the medium surface 122 so that the magnetic head assemblies 121 may access different tracks of the magnetic medium 112 to read or record data. Each slider 113 is attached to an actuator arm 119 by way of a suspension 115. The suspension 115 provides a slight spring force which biases the slider 113 toward the medium surface 122. Each actuator arm 119 is attached to an actuator means 127. The actuator means 127 as shown in FIG. 1A may be a voice coil motor (VCM). The VCM includes a coil movable within a fixed magnetic field, the direction and speed of the coil movements being controlled by the motor current signals supplied by control unit 129.

During operation of a HAMR enabled magnetic media drive 100, the rotation of the magnetic medium 112 generates an air bearing between the slider 113 and the medium surface 122 which exerts an upward force or lift on the slider 113. The air bearing thus counter-balances the slight spring force of suspension 115 and supports slider 113 slightly above the medium surface 122 by a small, substantially constant spacing during normal operation. The radiation source heats up the high-coercivity media so that the write elements of the magnetic head assemblies 121 may correctly magnetize the data bits in the magnetic medium 112.

The various components of the magnetic media drive 100 are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on media 112. Write and read signals are communicated to and from write and read heads on the magnetic head assemblies 121 by way of recording channel 125.

The above description of a typical magnetic media storage system and the accompanying illustration of FIG. 1A are for representation purposes only. It should be apparent that magnetic media storage systems may contain a large number of media and actuators, and each actuator may support a number of sliders.

Figure 1B:
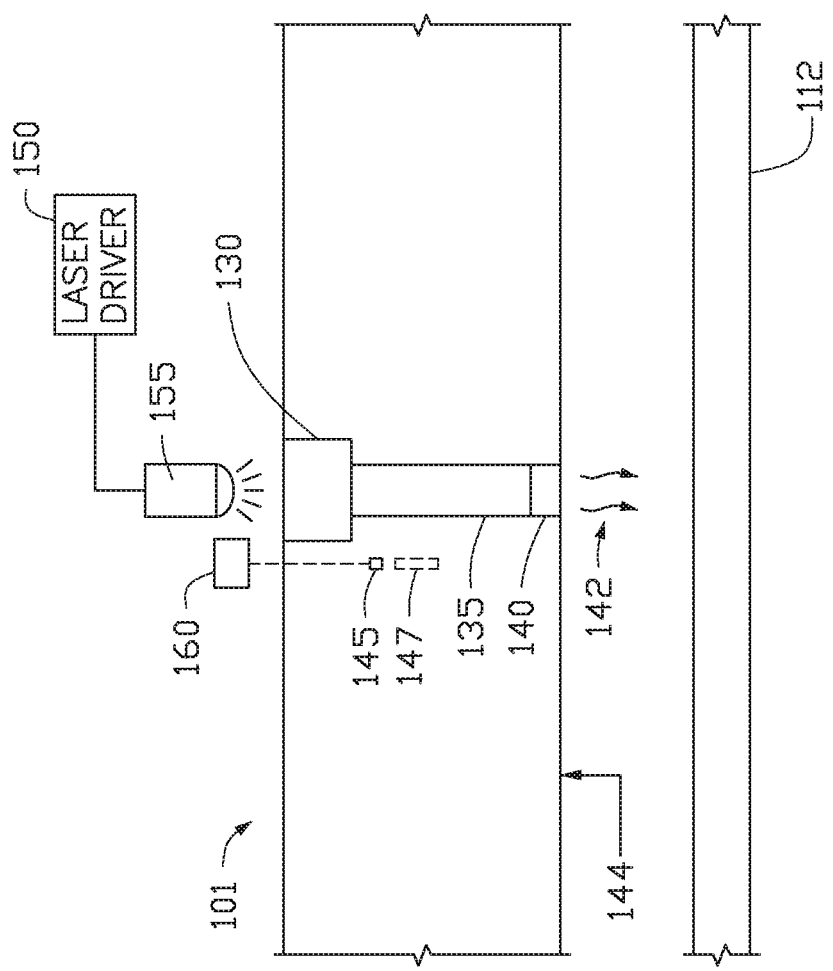
FIG. 1B is a cross sectional schematic view of a HAMR enabled write head according to one embodiment described herein.

FIG. 1B is a cross sectional schematic view of a HAMR enabled write head 101, according to one embodiment described herein. The head 101 is operatively attached to a laser diode (LD) 155 that is powered by a laser driver 150. The LD 155 may be placed directly on the head 101 or radiation may be delivered from the LD 155 located off the slider 113 through an optical fiber or waveguide 135. Similarly, the laser driver 150 circuitry may be located on the slider 113 or on a system-on-chip (SOC) associated with the magnetic media drive 100 such as control unit 129. The head 101 includes a spot-size converter 130 for focusing the radiation transmitted by the LD 155 into the waveguide 135. In another embodiment, the magnetic media drive 100 may include one or more lens for focusing the beamspot of the LD 155 before the emitted radiation reaches the spot-size converter 130. The waveguide 135 is a channel that transmits the radiation through the height of the head 101 to a near field transducer 140—e.g., a plasmonic device or an optical transducer—which is located at or near a media facing surface (MFS) 144, such as an air bearing surface (ABS). The waveguide 135 may extend in a direction that is substantially perpendicular to the MFS 144, as shown in FIG. 1B. Alternatively, the waveguide 135 may not extend in a direction that is substantially perpendicular to the MFS 144, due to turns in the plane of the substrate or for better coupling to the NFT 140. The NFT 140 further focuses the beamspot to avoid heating neighboring tracks of data on the medium 112—i.e., creates a beamspot much smaller than the diffraction limit. As shown by arrows 142, this optical energy emits from the NFT 140 to the surface of the medium 112 below the MFS 144 of the head 101. The embodiments herein are not limited to any particular type of NFT and may operate with, for example, either a c-aperature, e-antenna plasmonic near-field source, or any other shaped transducer known in the art.

A thermal sensor 145, or a waveguide sensor, is located adjacent the waveguide 135. The thermal sensor 145 may be a thermistor or resistance temperature detector (RTD) where the electrical resistance of the material comprising the thermal sensor 145 changes as the temperature of the material varies (either inversely or directly). As the light from LD 155 goes through the waveguide 135, about five percent or less of the optical power is used to heat the thermal sensor 145, causing the resistance of the thermal sensor 145 to change. The thermal sensor 145 may be electrically coupled to the laser driver 150 or some other control device to measure the electrical resistance of the thermal sensor 145. In one embodiment, the thermal sensor 145 is electrically coupled to a preamplifier 160 attached to a head stack assembly (not shown). This change in electrical resistance in the thermal sensor 145 may then be used as a feedback control signal to adjust the current supply of the LD 155.

A second thermal sensor 147, or a reference sensor, may be located nearby the thermal sensor 145 so the two sensors are at a similar background temperature. However, the second thermal sensor 147 may be farther away from the waveguide 135 than the thermal sensor 145, thus the second thermal sensor 147 is illustrated in dotted line since the second thermal sensor 147 may not be viewable from the cross sectional diagram shown in FIG. 1B. During writing with the LD 155, the difference in the resistance between the thermal sensor 145 and the thermal sensor 147 is measured. With the thermal sensor 145 and the thermal sensor 147, monitoring the optical power may be achieved while no optical components are needed, no additional assembly steps are needed, and no significant reflection is added to the system which can create adverse interference effects due to the coherency of the laser light. In addition, with two thermal sensors, temperature variations due to optical power fluctuation or ambient temperature drift may be differentiated.

Figure 2:
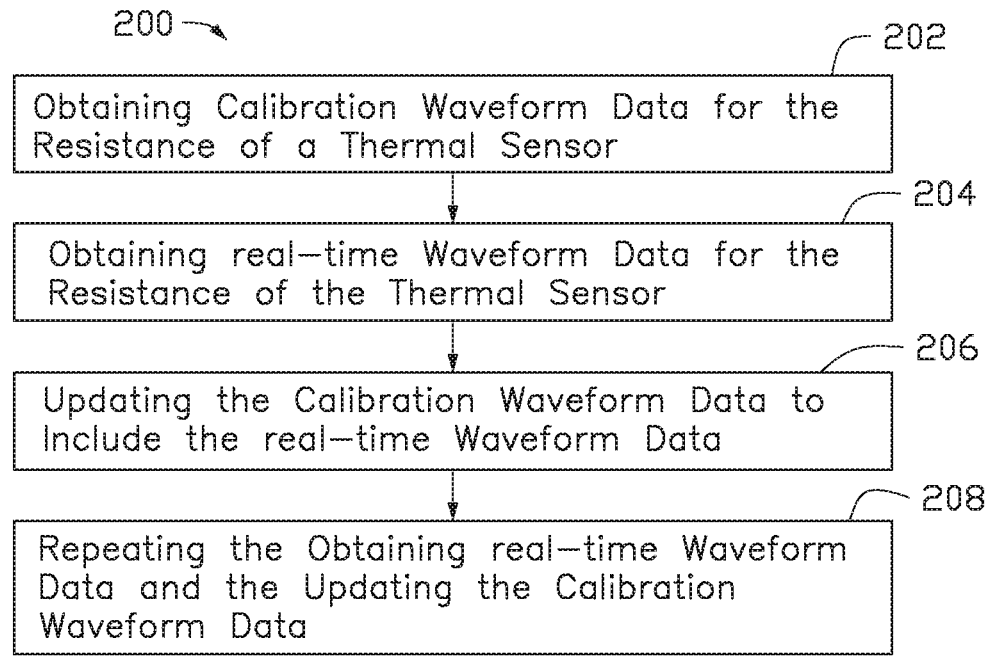
FIG. 2 illustrates a method for increasing bandwidth of a thermal sensor shown in FIG. 1B according to one embodiment described herein.

Typically, the thermal sensor 145 has a relatively slow response time, and it is very difficult for the bandwidth of the thermal sensor 145 to be above 1 MHz. In order to increase the bandwidth of the thermal sensor 145, advanced electrical detection techniques are utilized. FIG. 2 illustrates a method 200 for increasing the bandwidth of the thermal sensor 145 according to one embodiment described herein. The method 200 starts with obtaining calibration waveform data for the resistance of a thermal sensor, such as the thermal sensor 145, by calibrating the thermal sensor, as shown at block 202. The calibration of the thermal sensor is conducted when the thermal sensor is at a transient state, i.e., before reaching a steady state, and the transient waveform of the thermal sensor is intrinsic to the thermal sensor.

Figure 3A:
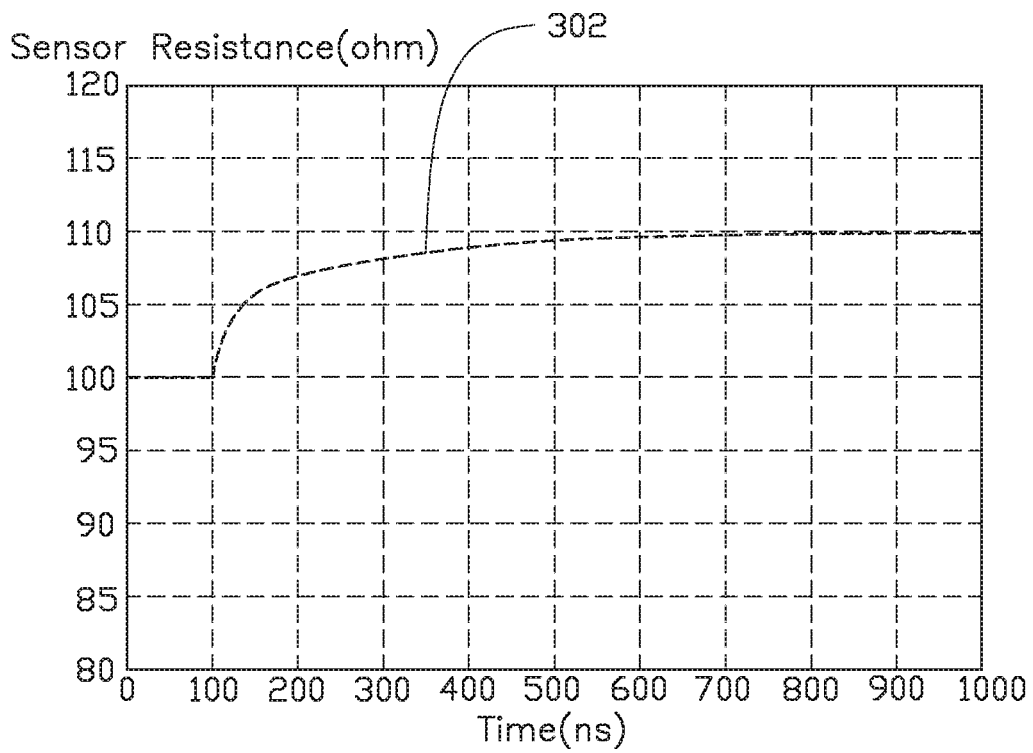
FIG. 3A illustrates an example of calibration waveform data for the thermal sensor shown in FIG. 1B according to one embodiment described herein.

FIG. 3A illustrates an example of calibration waveform data for the thermal sensor according to one embodiment described herein. As shown in FIG. 3A, calibration waveform data 302 of a response time for the thermal sensor is shown as a relationship between sensor resistance and time. The calibration waveform data 302 is obtained while the thermal sensor is operating at the transient state before reaching a steady state. As shown in FIG. 3A, at around 100 nanoseconds (ns), a LD, such as the LD 155, is turned on, and the resistance of the thermal sensor before turning on the LD stays constant. After the LD is turned on, the resistance of the thermal sensor increases due to heating from the evanescent field of a waveguide, such as the waveguide 135 shown in FIG. 1B. The calibration waveform data 302 is obtained without the LD having any power fluctuation. Different fluctuation magnitudes can lead to a different scale of the waveform data.

Referring back to FIG. 2, at block 204, real-time waveform data for the resistance of the thermal sensor that may deviate from the calibration waveform data is obtained by sampling the thermal sensor resistance at a predetermined time interval. The deviation of the real-time waveform data for the thermal sensor may be greater than noise in the waveform data and may be greater than a predetermined threshold value. In one embodiment, the threshold value is at most one percent deviation from the sensor resistance in the calibration waveform data. Once the deviation in the real-time waveform data is determined not to be noise, the deviation in the real-time waveform data can be presumed to be caused by a power fluctuation in the LD. The power fluctuation in the LD may be caused by mode hopping, operation temperature drift, and aging. The predetermined sampling time interval can be set at 10 ns, corresponding to a bandwidth of 100 MHz, which is much higher than the typical bandwidth of the thermal sensor. The predetermined sampling time interval may range from about 5 ns to about 20 ns. The bandwidth of the thermal sensor is based on the sampling time interval, and the typical response time of the thermal sensor is not a limitation to the operation bandwidth of the thermal sensor.

Figure 3B:
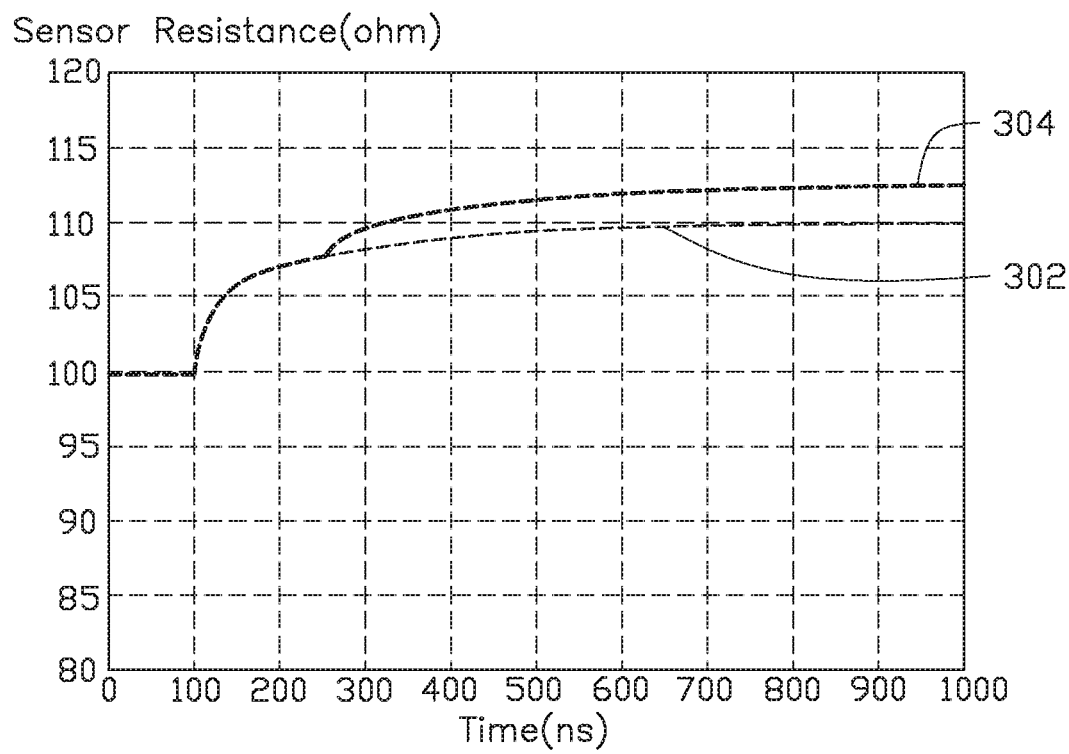
FIG. 3B illustrates an example of updated calibration waveform data for the thermal sensor shown in FIG. 1B according to one embodiment described herein.

Next, at block 206, the calibration waveform data is updated to include the real-time waveform data obtained at block 204. FIG. 3B illustrates an example of updated calibration waveform data for the thermal sensor according to one embodiment described herein. As shown in FIG. 3B, the updated calibration waveform data includes the calibration waveform data 302 and real-time waveform data 304 for the thermal sensor. The real-time waveform data 304 is registered at about 250 ns when the sensor resistance of the thermal sensor is deviated from the calibration waveform data by at most one percent. The real-time waveform data 304 becomes the standard, or the anticipated waveform data, for any subsequent real-time waveform data to compare thereto.

Referring back to FIG. 2, at block 208, the obtaining real-time waveform data (block 204) and updating the calibration waveform data (block 206) are repeated whenever laser diode is turned on (write operation occurs). Any deviated real-time waveform data obtained can be used to presume that there is a power fluctuation in the LD, and actions, such as stopping the writing process, may be performed in order to compensate for the power fluctuation. The deviated real-time waveform data is added to the calibration waveform data each time the deviated real-time waveform data is obtained, and the current deviated real-time waveform data serves as the standard for the next deviated real-time waveform data to compare to. The thermal sensor's bandwidth is based on the sampling time interval, which is much faster than the bandwidth based on the thermal sensor's typical response time.

The method 200 illustrates a way to increase the bandwidth of the thermal sensor by advanced electrical detection techniques, which relate to signal processing techniques. An alternative or additional method to increase the bandwidth of the thermal sensor is to heat and maintain the thermal sensor at an elevated temperature during operation. Typically, multiple time constants are associated with the transient behavior of the thermal sensor. The fast time constant may be as fast as 20 ns, while the slow time constant is around 200 ns to 500 ns. The slow time constant may dictate the overall detection bandwidth for the thermal sensor when the thermal sensor is not operating at a steady state. Conventionally, the temperature of the thermal sensor operates at around 20 to 25 degrees Celsius and may change as the optical power going through the waveguide changes. Any changes to the temperature of the thermal sensor can affect the operation of the thermal sensor, causing the thermal sensor not operating at the steady state. As a result, the slow time constant dictate the overall detection bandwidth for the thermal sensor. By heating and maintaining the temperature of the thermal sensor, the thermal sensor's steady state operation is not changed and the fast time constant dictates the overall detection bandwidth for the thermal sensor.

Figure 4:
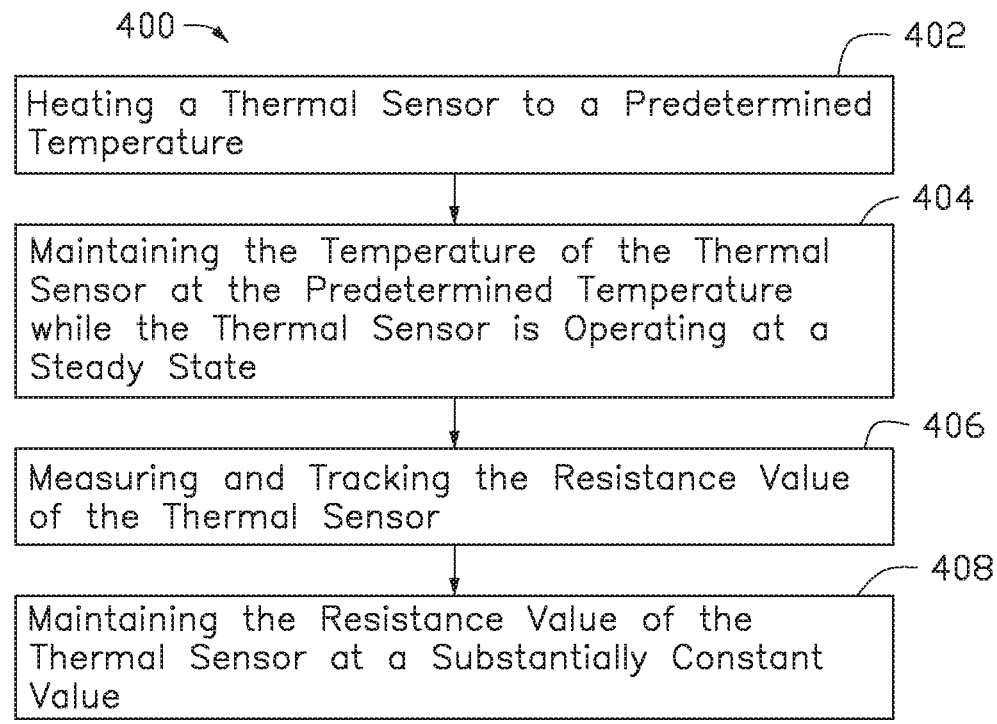
FIG. 4 illustrates a method for increasing bandwidth of the thermal sensor shown in FIG. 1B according to another embodiment described herein.

FIG. 4 illustrates a method 400 for increasing the bandwidth of the thermal sensor according to one embodiment described herein. The method 400 starts with heating a thermal sensor, such as the thermal sensor 145 shown in FIG. 1B, to a predetermined temperature, as shown at block 402. The predetermined temperature may range from about 30 degrees Celsius to about 40 degrees Celsius. The heating of the thermal sensor may be performed by resistive heating, such as increasing the current flowing through the thermal sensor. Next, at block 404, the temperature of the thermal sensor is maintained at the predetermined temperature while the thermal sensor is operating at a steady state prior to a write operation. At block 406, the resistance value of the thermal sensor is measured and tracked. The resistance value of a reference sensor, such as the thermal sensor 147 shown in FIG. 1B, may be tracked along with the resistance value of the thermal sensor. The measuring and tracking of the resistance value of the thermal sensor and the reference sensor may be performed by a preamplifier, such as the preamplifier 160 shown in FIG. 1B.

Next, at block 408, the resistance of the thermal sensor is maintained at a substantially constant value during the writing operation. Upon an optical power fluctuation, the thermal sensor is getting heated or cooled and the resistance value of the thermal sensor starts to rise or drop with the fast time constant, since the thermal sensor is operating at a steady state (the temperature of the thermal sensor has not yet changed enough to cause the thermal sensor to not operate at a steady state). The heating or cooling of the thermal sensor can be detected by the preamplifier. The preamplifier reduces or increases the current flowing through the thermal sensor to compensate for the heating or cooling as a result of the optical power fluctuation, and the preamplifier deduces the amount of optical power change amplitude through the amount of change in the current flowing through the thermal sensor.

By adjusting the current flowing through the thermal sensor (increasing or decreasing), the temperature of the thermal sensor and the resistance of the thermal sensor are kept at a substantially constant level, and the thermal sensor's steady state operation is maintained. Since the thermal sensor is operating at a steady state, any optical power fluctuation can be detected by the thermal sensor with the fast time constant, which increases the bandwidth of the thermal sensor.

Figure 5:
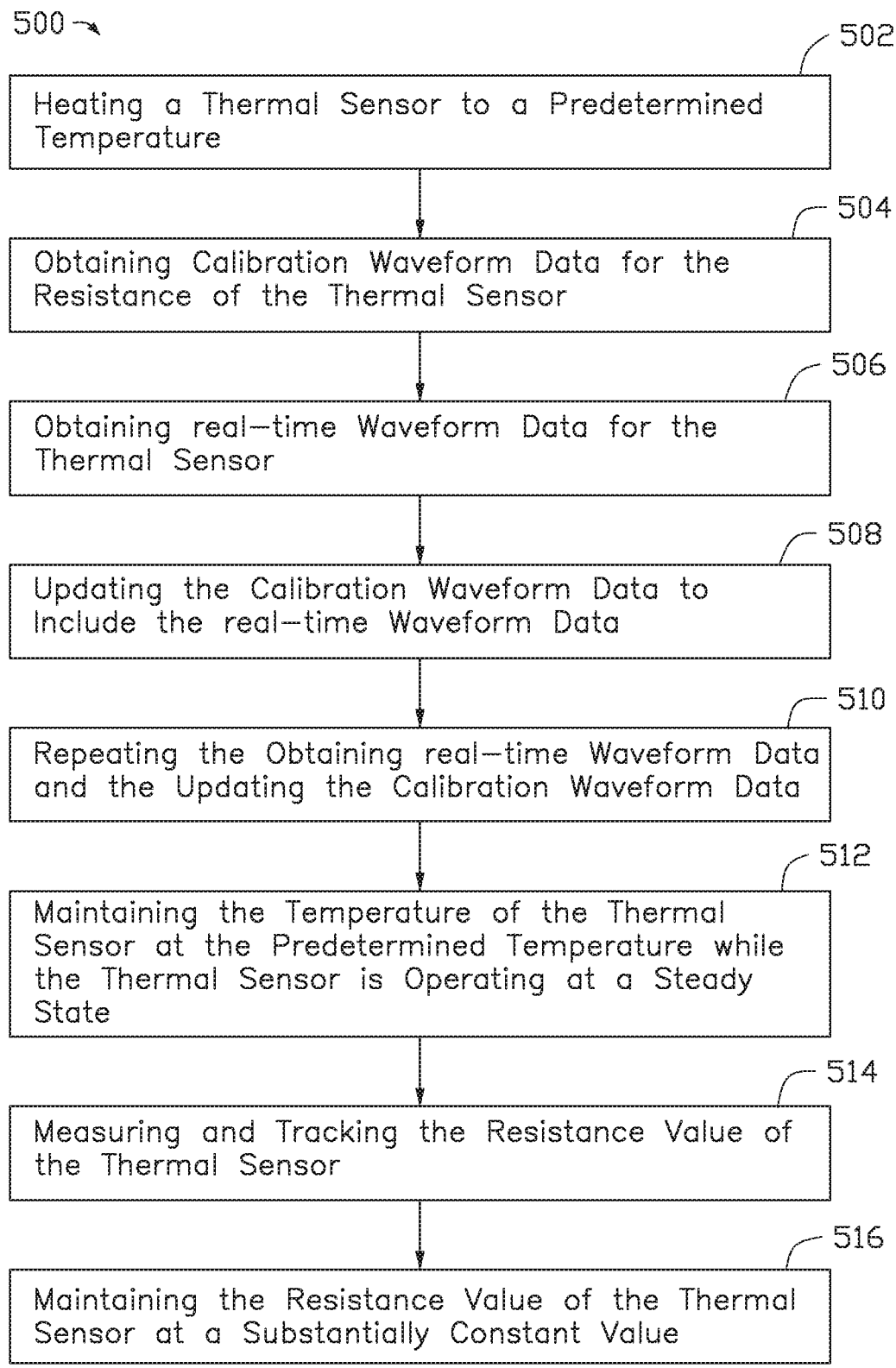
FIG. 5 illustrates a method for increasing bandwidth of the thermal sensor shown in FIG. 1B according to another embodiment described herein.

The method 400 described herein may be performed along with the method 200 described herein in order to further increase the bandwidth of the thermal sensor. FIG. 5 illustrates a method 500 for increasing the bandwidth of the thermal sensor shown in FIG. 1B according to another embodiment described herein. The method 500 is a method combining the method 200 and the method 400. The method 500 starts with heating a thermal sensor to a predetermined temperature, as shown at block 502. The method shown at block 502 may be the same as the method shown at block 402. Next, calibration waveform data for the resistance of the thermal sensor, such as the thermal sensor 145, is obtained by calibrating the thermal sensor, as shown at block 504. The method shown at block 504 may be the same as the method shown at block 202. Next, real-time waveform data for the resistance of the thermal sensor that may deviate from the calibration waveform data is obtained by sampling the thermal sensor resistance at a predetermined time interval, as shown at block 506. The method shown at block 506 may be the same as the method shown at block 204. Next, at block 508, the calibration waveform data is updated to include the real-time waveform data obtained at block 506. The method shown at block 508 may be the same as the method shown at block 206. Next, at block 510, the obtaining real-time waveform data (block 506) and updating the calibration waveform data (block 508) are repeated during writing operations. The method shown at block 510 may be the same as the method shown at block 208.

Next, at block 512, the temperature of the thermal sensor is maintained at the predetermined temperature while the thermal sensor is operating at a steady state. The method shown at block 512 may be the same as the method shown at block 404. At block 514, the resistance value of the thermal sensor is measured and tracked. The method shown at block 514 may be the same as the method shown at block 406. Next, at block 516, the resistance of the thermal sensor is maintained at a substantially constant value during the writing operation. The method shown at block 516 may be the same as the method shown at block 408. At block 516, the threshold resistance value change as described at block 506 may be very small, such that the change in the resistance value is small enough that the resistance is still considered as substantially constant as described at block 516. By combining these two approaches, the bandwidth of the sensor is no longer limited by the fast time constant of its transient response.

In summary, methods for decreasing response time of a thermal sensor in a HAMR device are disclosed. In one embodiment, the response time of the thermal sensor is decreased by obtaining calibration waveform data and updating the calibration waveform data to include deviated waveform data. The sampling time interval use to sample waveform data dictates the operation bandwidth of the thermal sensor instead of the response time based on the thermal sensor's typical response time. In another embodiment, the response time of the thermal sensor is decreased by heating and maintaining the thermal sensor at an elevated temperature. Maintaining the temperature of the thermal sensor at a substantially constant level leads to operating the thermal sensor at a steady state, and the fast time constant of the thermal sensor dictates the overall detection bandwidth of the thermal sensor. The methods described above may be combined to further decrease the response time of the thermal sensor.

While the foregoing is directed to embodiments of the disclosure, other and further embodiments may be devised without departing from the basic scope thereof, and the scope thereof is determined by the claims that follow.

What is claimed is:
1. A device formed by a method, comprising:
obtaining calibration waveform data for a resistance of a thermal sensor;
measuring real-time waveform data for the resistance of the thermal sensor by sampling the resistance of the thermal sensor at a predetermined time interval, wherein the predetermined time interval corresponds to a bandwidth greater than a bandwidth of the thermal sensor;

determining deviated real-time waveform data;

updating the calibration waveform data to include the deviated real-time waveform data; and repeating the measuring real-time waveform data, determining deviated real-time waveform data and updating the calibration waveform data.

2. The device of claim 1, wherein the deviated real-time waveform data is greater than a predetermined threshold value.

3. The device of claim 2, wherein the predetermined threshold value is at most one percent deviation from a resistance in the calibration waveform data.

4. The device of claim 1, wherein the predetermined time interval ranges from about 5 nano seconds to about 20 nano seconds.

5. The device of claim 1, wherein the deviated real-time waveform data is caused by a power fluctuation in a laser diode.

6. A device formed by a method, comprising:

heating a thermal sensor to a predetermined temperature greater than an operating temperature of the thermal sensor;

maintaining the temperature of the thermal sensor at the predetermined temperature while the thermal sensor is operating at a steady state;

measuring and tracking a resistance value of the thermal sensor; and maintaining the resistance value of the thermal sensor at a substantially constant value.

7. The device of claim 6, wherein the predetermined temperature ranges from about 30 degrees Celsius to about 40 degrees Celsius.

8. The device of claim 6, wherein the heating of the thermal sensor is performed by resistive heating.

9. The device of claim 6, further comprising measuring and tracking a resistance of a reference sensor.

10. The device of claim 6, wherein the maintaining the resistance value of the thermal sensor at the substantially constant value comprises increasing or decreasing a current flowing through the thermal sensor.

11. The device of claim 10, wherein the increasing or decreasing the current flowing through the thermal sensor is performed by a preamplifier.

12. A device formed by a method, comprising:

heating a thermal sensor to a predetermined temperature greater than an operating temperature of the thermal sensor;

obtaining calibration waveform data for a resistance of the thermal sensor;

obtaining real-time waveform data for the resistance of the thermal sensor;

updating the calibration waveform data to include the real-time waveform data;

repeating the obtaining real-time waveform data and updating the calibration waveform data;

maintaining the temperature of the thermal sensor at the predetermined temperature while the thermal sensor is operating at a steady state;

measuring and tracking a resistance value of the thermal sensor; and maintaining the resistance value of the thermal sensor at a substantially constant value.

13. The device of claim 12, wherein a deviation of the real-time waveform data from the calibration waveform data is greater than a predetermined threshold value.

14. The device of claim 13, wherein the predetermined threshold value is at most one percent deviation from a resistance shown in the calibration waveform data.

15. The device of claim 12, wherein the real-time waveform data is obtained by sampling the resistance of the thermal sensor at a predetermined time interval.

16. The device of claim 15, wherein the predetermined time interval ranges from about 5 nano seconds to about 20 nano seconds.

17. The device of claim 12, wherein the predetermined temperature ranges from about 30 degrees Celsius to about 40 degrees Celsius.

18. The device of claim 12, wherein the heating of the thermal sensor is performed by resistive heating.

19. The device of claim 12, wherein the maintaining the resistance value of the thermal sensor at the substantially constant value comprises increasing or decreasing a current flowing through the thermal sensor.

* * * * *